United States Patent
Tsukamoto et al.

(10) Patent No.: US 10,808,835 B2
(45) Date of Patent: Oct. 20, 2020

(54) SHIFT CONTROL DEVICE OF VEHICLE

(71) Applicants: TOYOTA JIDOSHA KABUSHIKI KAISHA, Toyota-shi, Aichi (JP); AISIN AW CO., LTD., Anjo-shi, Aichi (JP)

(72) Inventors: Norihiro Tsukamoto, Toyota (JP); Tomohiro Asami, Nisshin (JP); Hiromasa Takai, Anjo (JP); Masataka Hirano, Anjo (JP); Daiki Fukuda, Anjo (JP); Takuma Sugino, Anjo (JP)

(73) Assignees: TOYOTA JIDOSHA KABUSHIKI KAISHA, Toyota (JP); AISIN AW CO., LTD., Anjo (JP)

( * ) Notice: Subject to any disclaimer, the term of this patent is extended or adjusted under 35 U.S.C. 154(b) by 257 days.

(21) Appl. No.: 15/909,140

(22) Filed: Mar. 1, 2018

(65) Prior Publication Data
US 2018/0252311 A1 Sep. 6, 2018

(30) Foreign Application Priority Data
Mar. 2, 2017 (JP) .................................. 2017-039839

(51) Int. Cl.
*F16H 61/02* (2006.01)
*F16H 61/04* (2006.01)
(Continued)

(52) U.S. Cl.
CPC ..... *F16H 61/0213* (2013.01); *F16H 61/0403* (2013.01); *F16H 61/061* (2013.01);
(Continued)

(58) Field of Classification Search
CPC ............ F16H 61/0213; F16H 61/0403; F16H 61/0425; F16H 61/061; F16H 61/10;
(Continued)

(56) References Cited

U.S. PATENT DOCUMENTS

| 2001/0054532 | A1  | 12/2001 | Ohashi et al. |
| 2014/0106931 | A1* | 4/2014  | Honma ................. B60W 10/06 477/77 |
| 2015/0120155 | A1  | 4/2015  | Masunaga et al. |

FOREIGN PATENT DOCUMENTS

| CN | 104285083 A | 1/2015 |
| JP | 2001-311462 A | 11/2001 |
| JP | 2006-112247 A | 4/2006 |

* cited by examiner

*Primary Examiner* — David R Morris
*Assistant Examiner* — Lori Wu
(74) *Attorney, Agent, or Firm* — Oliff PLC

(57) ABSTRACT

A shift control device of a vehicle including an internal combustion engine and a multi-speed transmission in series, the shift control device comprises: a control portion providing a downshift control in which an input shaft rotation speed of the multi-speed transmission is increased through a torque-up of the internal combustion engine toward a post-shift input shaft rotation speed in a neutral state where a release-side engagement device to be released during a downshift of the multi-speed transmission is released, so as to engage an engagement-side engagement device to be engaged after the shift. In the case of a shift pattern having a large internal inertia of the multi-speed transmission, the control portion controls a torque capacity of the engagement-side engagement device to a value greater than zero before starting a torque-up control of the internal combustion engine.

16 Claims, 6 Drawing Sheets

(51) Int. Cl.
*F16H 61/10* (2006.01)
*F16H 61/16* (2006.01)
*F16H 61/06* (2006.01)
*F16H 61/686* (2006.01)
*F16H 63/50* (2006.01)

(52) U.S. Cl.
CPC .............. *F16H 61/10* (2013.01); *F16H 61/16* (2013.01); *F16H 61/686* (2013.01); *F16H 63/502* (2013.01); *F16H 2061/0227* (2013.01); *F16H 2061/0237* (2013.01); *F16H 2061/0425* (2013.01); *F16H 2061/0451* (2013.01); *F16H 2061/0455* (2013.01); *F16H 2061/0488* (2013.01); *F16H 2061/166* (2013.01); *Y02T 10/76* (2013.01)

(58) Field of Classification Search
CPC ...... F16H 61/16; F16H 61/686; F16H 63/502; F16H 2061/0227; B60W 10/06; B60W 10/115; B60W 30/19
See application file for complete search history.

|      | C1 | C2 | C3 | C4 | B1 | B2 |
|------|----|----|----|----|----|----|
| 1st  | O  |    |    |    |    | O  |
| 2nd  | O  |    |    |    | O  |    |
| 3rd  | O  |    | O  |    |    |    |
| 4th  | O  |    |    | O  |    |    |
| 5th  | O  | O  |    |    |    |    |
| 6th  |    | O  |    | O  |    |    |
| 7th  |    | O  | O  |    |    |    |
| 8th  |    | O  |    |    | O  |    |
| Rev  |    |    | O  |    |    | O  |

O : ENGAGEMENT   BLANK : RELEASE

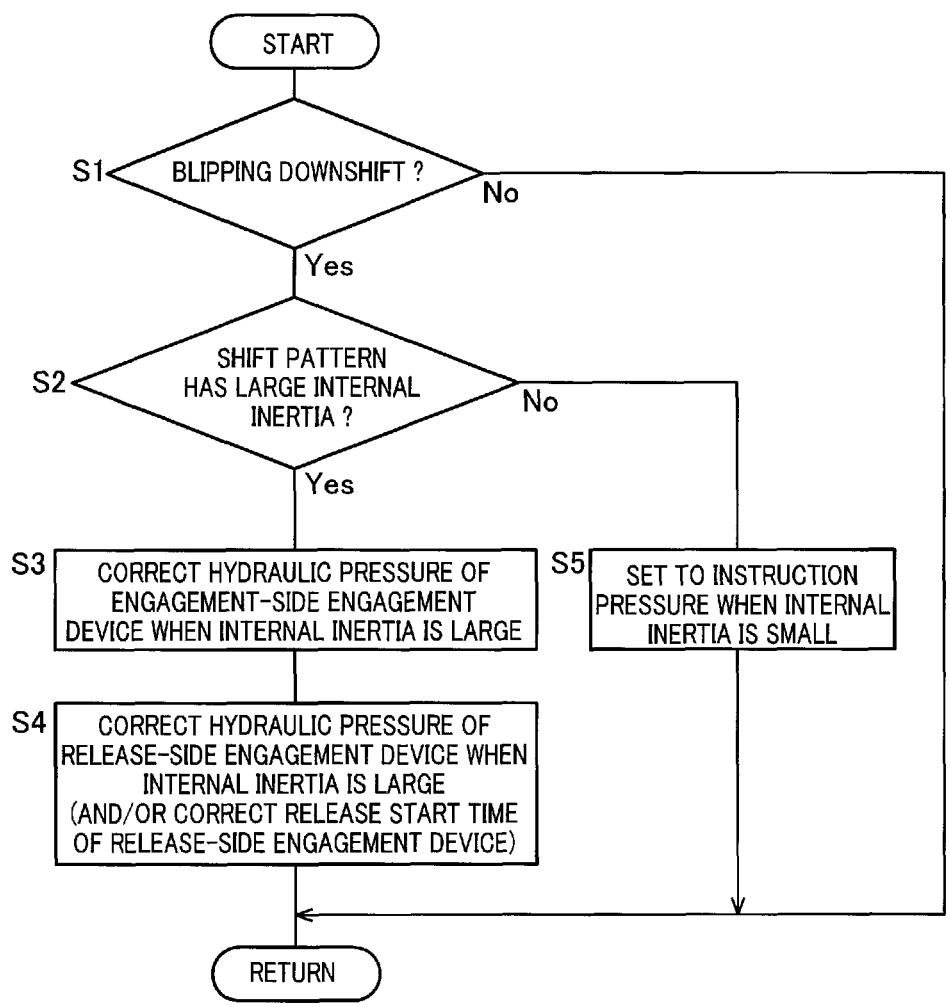

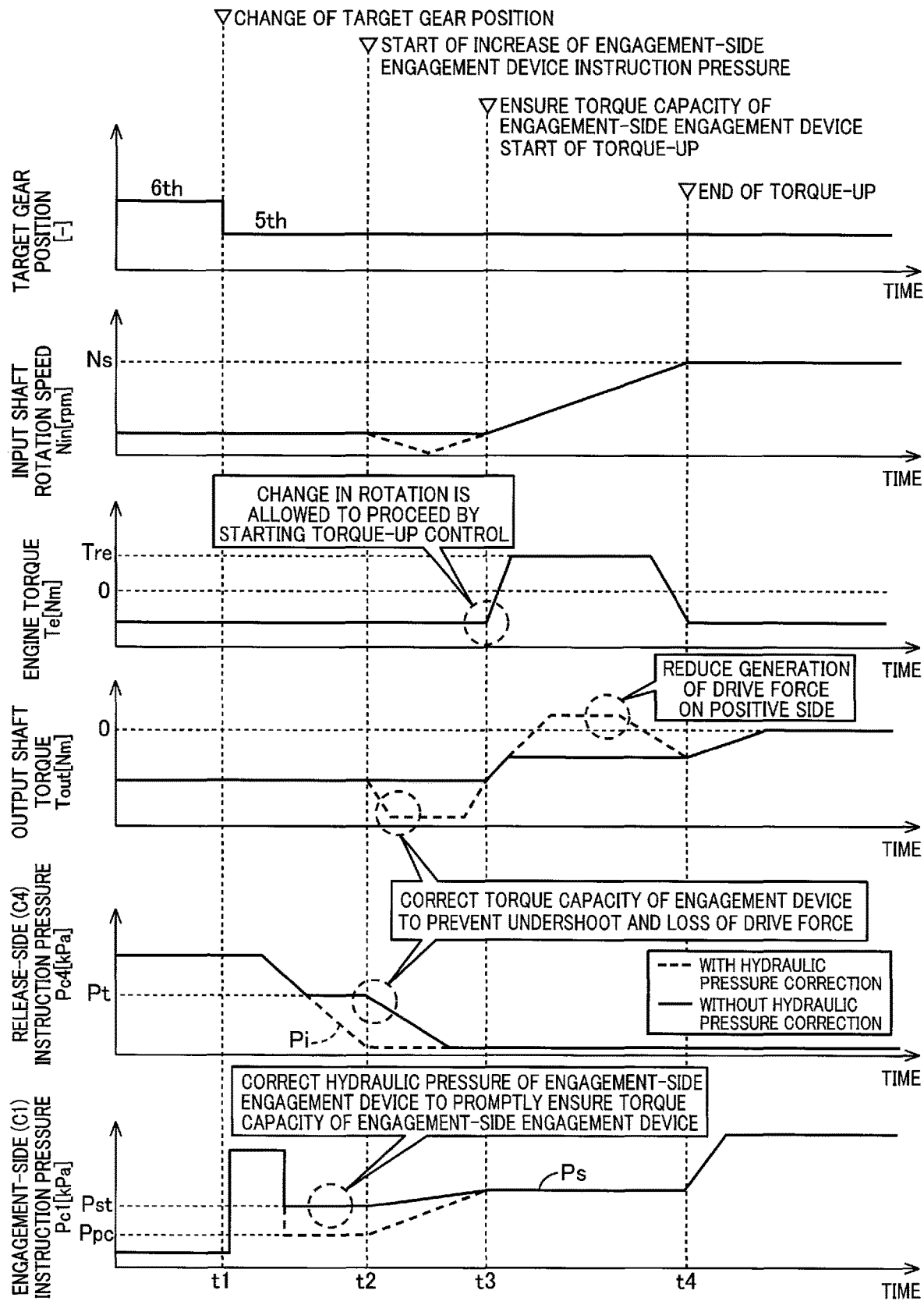

SHIFT CONTROL DEVICE OF VEHICLE

This application claims priority from Japanese Patent Application No. 2017-039839 filed on Mar. 2, 2017, the disclosure of which is herein incorporated by reference in its entirety.

BACKGROUND OF THE INVENTION

1. Field of the Invention

The present invention relates to a shift control device of a vehicle including an internal combustion engine and a multi-speed transmission.

2. Description of the Related Art

In a vehicle including an internal combustion engine and a multi-speed transmission, a shift control device of a vehicle is known that, at the time of a downshift of the multi-speed transmission, releases an engagement device forming a pre-shift gear position into a neutral state while providing a feedback control of an engine torque to synchronize a rotation speed of the internal combustion engine with a post-shift rotation speed so as to engage an engagement device forming a post-shift gear position after synchronization of the rotation speed of the internal combustion engine. This corresponds to an automotive shift control device described in Patent Document 1. It is described in Patent Document 1 that a target engine torque is obtained by adding to a driver request torque based on an accelerator opening degree, a predetermined torque-up amount for maintaining an engine rotation speed of an engine (internal combustion engine) at a post-shift rotation speed (synchronous rotation speed), during a predetermined torque-up time after a start of an engagement operation of an engagement device, so as to control an engine torque to this target engine torque. It is also described that even after the engine rotation speed reaches the synchronous rotation speed, an engine torque for maintaining the synchronous rotation speed is output to suppress a shift shock by maintaining the synchronous rotation speed during a response delay of the engagement device.

PRIOR ART DOCUMENT

Patent Document

Patent Document 1: JP-2006-112247A

In a downshift of the multi-speed transmission controlled as in the shift control device of Patent Document 1, when the multi-speed transmission is in the neutral state and the multi-speed transmission has a large internal inertia during a torque-up control of the engine for synchronizing an input shaft rotation speed of the multi-speed transmission with the synchronous rotation speed, a shock may occur since a drive force is transmitted to the output side of the multi-speed transmission in response to a reaction force due to the internal inertia associated with an increase in rotation due to the torque-up control of the engine even in the neutral state.

SUMMARY OF THE INVENTION

The present invention was conceived in view of the situations and it is therefore an object of the present invention to provide, in a vehicle including an internal combustion engine and a multi-speed transmission, a control device suppressing a shock due to an internal inertia in a device providing a downshift control of synchronizing an input shaft rotation speed of the multi-speed transmission with a post-shift rotation speed through a torque-up control of the internal combustion engine in a neutral state of the multi-speed transmission so as to engage an engagement-side engagement device.

The object indicated above is achieved according to a first aspect of the present invention, which provides a shift control device of a vehicle including an internal combustion engine and a multi-speed transmission in series, the shift control device comprising: a control portion providing a downshift control in which an input shaft rotation speed of the multi-speed transmission is increased through a torque-up of the internal combustion engine toward a post-shift input shaft rotation speed in a neutral state where a release-side engagement device to be released during a downshift of the multi-speed transmission is released, so as to engage an engagement-side engagement device to be engaged after the shift, wherein in the case of a shift pattern having a large internal inertia of the multi-speed transmission, the control portion controls a torque capacity of the engagement-side engagement device to a value greater than zero before starting a torque-up control of the internal combustion engine.

A second aspect of the present invention provides the shift control device of a vehicle recited in the first aspect of the invention, comprising an engagement-side hydraulic pressure setting portion making an instruction pressure of the engagement-side engagement device set before starting the torque-up control of the internal combustion engine higher in the case of a shift pattern having a large internal inertia of the multi-speed transmission as compared to an instruction pressure of the engagement-side engagement device set in the case of a shift pattern in which the internal inertia is small.

A third aspect of the present invention provides the shift control device of a vehicle recited in the first or second aspect of the invention, comprising a release-side hydraulic pressure setting portion making an instruction pressure in release transition of the release-side engagement device set in the case of a shift pattern having a large internal inertia of the multi-speed transmission higher as compared to an instruction pressure in release transition of the release-side engagement device set in the case of a shift pattern in which the internal inertia is small.

A fourth aspect of the present invention provides the shift control device of a vehicle recited in any one of the first through third aspects of the invention, comprising a determining portion determining that the shift pattern has the large internal inertia when the internal inertia of the multi-speed transmission is larger than a predetermined value set in advance, and that the shift pattern has the small internal inertia when the internal inertia is not more than the predetermined value.

A fifth aspect of the present invention provides the shift control device of a vehicle recited in any one of the first through fourth aspects of the invention, wherein the internal inertia of the multi-speed transmission is determined based on an engagement device kept engaged before and after the shift.

According to the shift control device recited in the first aspect of the invention, if the shift pattern has the large internal inertia of the multi-speed transmission, the torque capacity of the engagement-side engagement device is controlled to the value greater than zero before the torque-up control of the internal combustion engine is provided, and therefore, a force acts in the direction suppressing the torque transmission to the output side of the multi-speed transmission due to the reaction force of the internal inertia at the time of torque-up control of the internal combustion engine. Thus, an increase in the drive force during the torque-up control of the internal combustion engine can be suppressed so as to restrain a shift shock from occurring during the downshift control.

According to the shift control device recited in the second aspect of the invention, if the shift pattern has the large internal inertia of the multi-speed transmission, the instruction pressure of the engagement-side engagement device set before starting the torque-up control of the internal combustion engine is set higher than the instruction pressure of the engagement-side engagement device set in the case of the shift pattern having the small internal inertia, so that the torque capacity of the engagement-side engagement device can promptly be ensured.

According to the shift control device recited in the third aspect of the invention, the instruction pressure in release transition of the release-side engagement device set in the case of the shift pattern having the large internal inertia of the multi-speed transmission is set higher than the instruction pressure of the release-side engagement device set in the case of the shift pattern having the small internal inertia, so that the drop of the rotation speed of the input shaft of the multi-speed transmission and the loss of the drive force can be restrained from occurring due to the multi-speed transmission entering the neutral state before starting the torque-up control of the internal combustion engine.

According to the shift control device recited in the fourth aspect of the invention, the shift pattern having the large internal inertia and the shift pattern having the small internal inertia can easily be determined based on whether the internal inertia is larger than the predetermined value or not more than the predetermined value.

According to the shift control device recited in the fifth aspect of the invention, since the internal inertia of the multi-speed transmission varies depending on the engagement device kept engaged before and after the shift, the internal inertia can easily be calculated by determining the engagement device kept engaged before and after the shift.

BRIEF DESCRIPTION OF DRAWINGS

FIG. 6 is a flowchart for explaining a main portion of the control operation of an electronic control device of FIG. 1, i.e. the control operation of suppressing a shift shock occurring during the blipping control.

FIG. 7 is an example of a time chart of a control state when the blipping control is provided based on the flowchart of FIG. 6, showing the control state in the case of a shift pattern having a large internal inertia.

DESCRIPTION OF EMBODIMENTS

An example of the present invention will now be described in detail with reference to the drawings. In the following example, the figures are simplified or deformed as needed and portions are not necessarily precisely drawn in terms of dimension ratio, shape, etc.

Example

Figure 1:
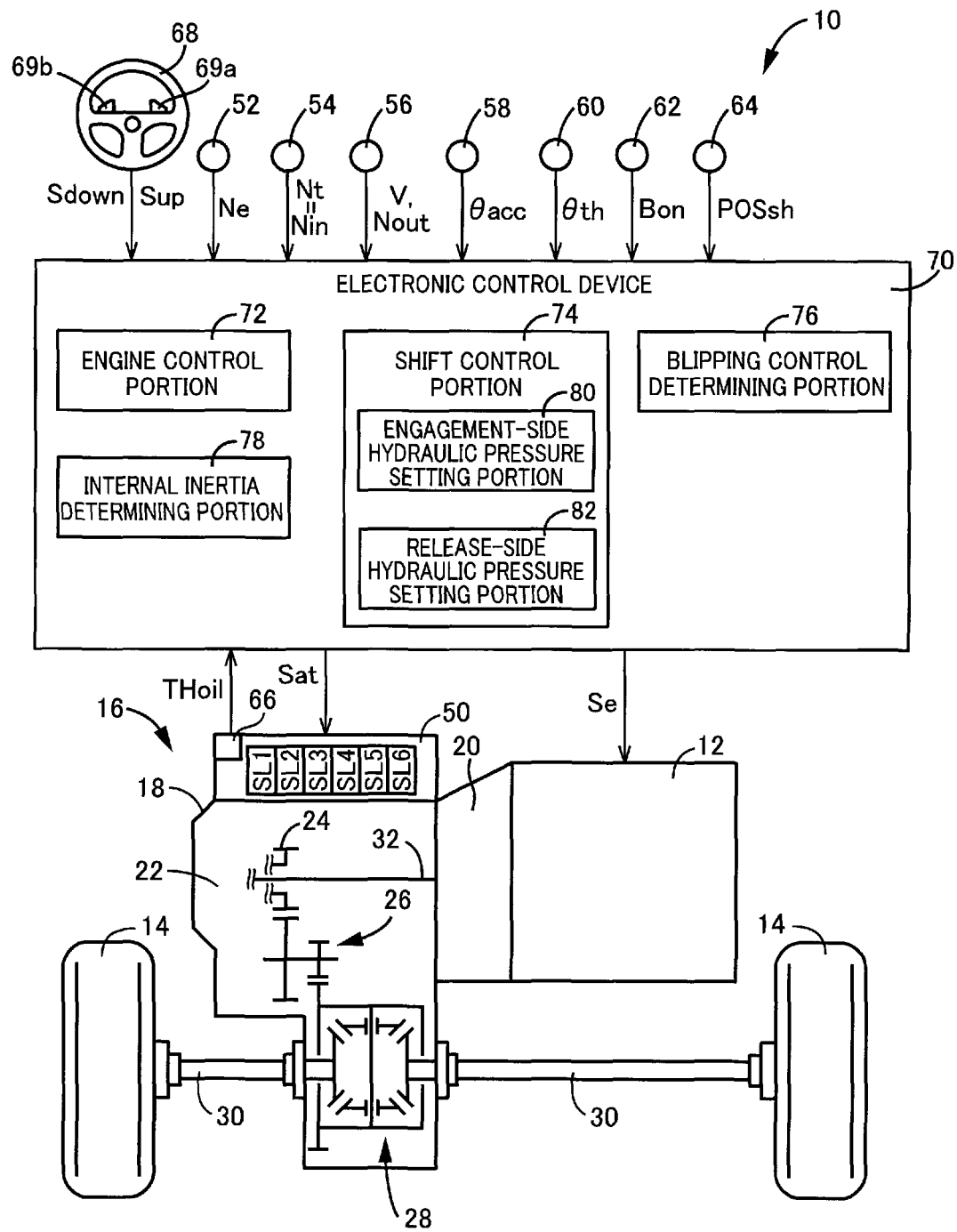
FIG. 1 is a diagram for explaining a general configuration of a vehicle to which the present invention is applied and is a diagram for explaining main portions of a control system for various controls in the vehicle.

FIG. 1 is a diagram for explaining a general configuration of a vehicle 10 to which the present invention is applied and is a diagram for explaining main portions of a control system for various controls in the vehicle 10. In FIG. 1, the vehicle 10 includes an engine 12, drive wheels 14, and a vehicle power transmission device 16 (hereinafter referred to as a power transmission device 16) disposed in a power transmission path between the engine 12 and the drive wheels 14. The power transmission device 16 includes, in a case 18 acting as a non-rotating member attached to a vehicle body, a torque converter 20, a multi-speed transmission (step-variable transmission) 22, a reduction gear mechanism 26 coupled to a transmission output gear 24 that is an output rotating member of the multi-speed transmission 22, a differential gear (differential gear device) 28 coupled to the reduction gear mechanism 26, etc. The power transmission device 16 also includes a pair of drive shafts (axles) 30 etc. coupled to the differential gear 28. In the power transmission device 16, the power (synonymous with torque and drive force if not particularly distinguished) output from the engine 12 is transmitted sequentially through the torque converter 20, the multi-speed transmission 22, the reduction gear mechanism 26, the differential gear 28, the drive shaft 30, etc. to the driving wheels 14.

The engine 12 is a drive force source of the vehicle 10 and is a known internal combustion engine such as a gasoline engine and a diesel engine. The engine 12 has an engine torque Te controlled by an electronic control device 70 described later controlling operating states such as an intake air amount, a fuel injection amount, and an ignition timing. The engine 12 corresponds to an internal combustion engine of the present invention.

Figures 2, 3:
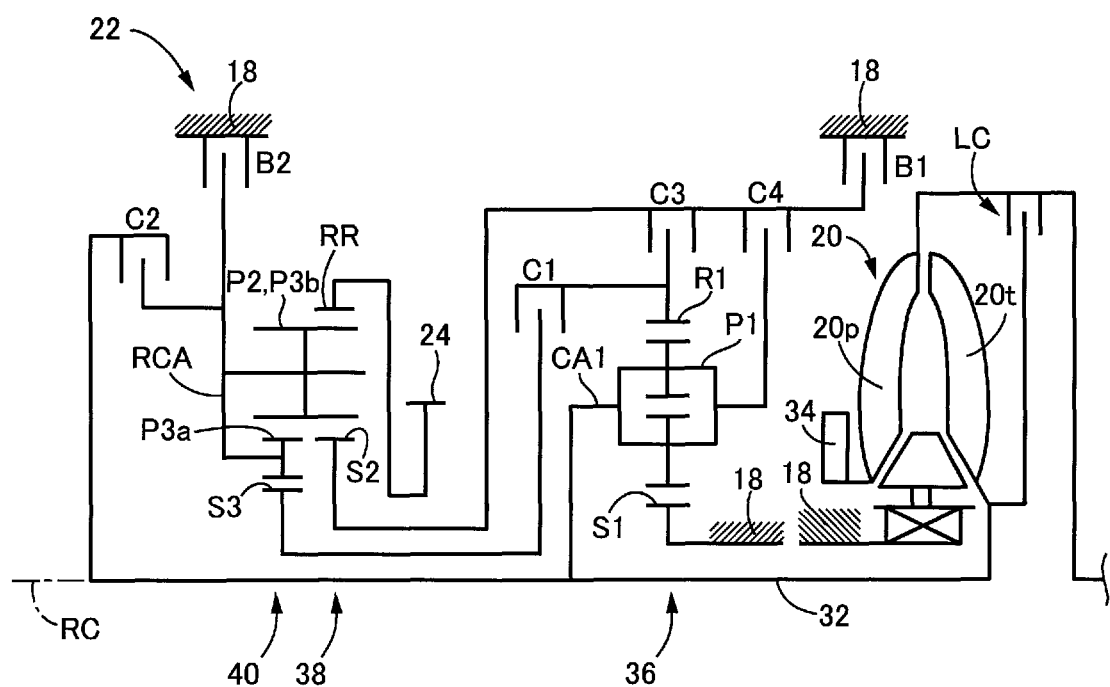
FIG. 2 is a schematic for explaining an example of a torque converter and a multi-speed transmission shown in FIG. 1.
FIG. 3 is an engagement operation table for establishing gear positions in the multi-speed transmission of FIG. 2.

FIG. 2 is a schematic for explaining an example of the torque converter 20 and the multi-speed transmission 22. The torque converter 20, the multi-speed transmission 22, etc. are configured substantially symmetrically with respect to an axial center RC of a transmission input shaft 32 (input shaft 32) that is an input rotating member of the multi-speed transmission 22 and have lower halves from the axial center RC not shown in FIG. 2.

In FIG. 2, the torque converter 20 is disposed to rotate around the axial center RC in a power transmission path between the engine 12 and the multi-speed transmission 22 and is a fluid transmission device including a pump impeller 20$p$ coupled to the engine 12, a turbine impeller 20$t$ coupled to the input shaft 32, etc. The input shaft 32 also serves as a turbine shaft rotationally driven by the turbine impeller 20$t$. The power transmission device 16 also includes a lockup clutch LC capable of direct coupling between the pump impeller 20$p$ and the turbine impeller 20$t$ (i.e., between input/output rotating members of the torque converter 20). The power transmission device 16 also includes a mechanical oil pump 34 coupled to the pump impeller 20p. The oil pump 34 is rotationally driven by the engine 12 to generate (discharge) a hydraulic fluid pressure serving as a source pressure for providing a shift control of the multi-speed transmission 22 and supplying lubrication oil to portions of the power transmission path of the power transmission device 16. Therefore, the hydraulic fluid pumped up by the oil pump 34 is supplied as a source pressure of a hydraulic control circuit 50 (see FIG. 1) included in the vehicle 10.

The multi-speed transmission 22 is a multi-speed type automatic transmission constituting a portion of a power transmission path between the engine 12 and the drive wheels 14, and is coupled in series to the engine 12 via the torque converter 20. The multi-speed transmission 22 is a planetary gear type multi-speed transmission having a double pinion type first planetary gear device 36 as well as a single pinion type second planetary gear device 38 and a double pinion type third planetary gear device 40 formed as a Ravigneaux type, on a coaxial line (on the axial center RC). The multi-speed transmission 22 includes hydraulic friction engagement devices, i.e., a first clutch C1, a second clutch C2, a third clutch C3, a fourth clutch C4, a first brake B1, and a second brake B2 (hereinafter simply referred to as engagement devices C if not particularly distinguished).

The first planetary gear device 36 includes a first sun gear S1, a plurality of pairs of first planetary gears P1 meshing with each other, a first carrier CA1 supporting the first planetary gear P1 such that the first planetary gear P1 is rotatable about its axis and an axis of the first planetary gear device, and a first ring gear R1 meshing via the first planetary gear P1 with the first sun gear S1. The second planetary gear device 38 includes a second sun gear S2, a second planetary gear P2, a carrier RCA supporting the second planetary gear P2 such that the second planetary gear P2 is rotatable about its axis and an axis of the second planetary gear device, and a ring gear RR meshing via the second planetary gear P2 with the second sun gear S2. The third planetary gear device 40 includes a third sun gear S3, a plurality of pairs of third planetary gears P3a, P3b meshing with each other, a carrier RCA supporting the third planetary gears P3a, P3b such that the third planetary gears P3a, P3b are rotatable about its axis and an axis of the third planetary gear device, and a ring gear RR meshing via the third planetary gears P3a, P3b with the third sun gear S3. In the second planetary gear device 38 and the third planetary gear device 40, the third planetary gear P3b and the second planetary gear P2 are commonalized, and the carriers are made up of the common carrier RCA while the ring gears are made up of the common ring gear RR, so that a so-called Ravigneaux type is achieved.

In the multi-speed transmission 22, the first sun gear S1 is coupled to the case 18. The first carrier CA1 is coupled to the input shaft 32. The first carrier CA1 and the second sun gear S2 are selectively coupled via the fourth clutch C4. The first ring gear R1 and the third sun gear S3 are selectively coupled via the first clutch C1. The first ring gear R1 and the second sun gear S2 are selectively coupled via the third clutch C3. The second sun gear S2 is selectively coupled via the first brake B1 to the case 18. The carrier RCA is selectively coupled via the second clutch C2 to the input shaft 32. The carrier RCA is selectively coupled via the second brake B2 to the case 18. The ring gear RR is coupled to the transmission output gear 24.

The multi-speed transmission 22 has a plurality of gear positions (gear shift positions) different in gear ratio (speed change ratio) γ (=input shaft rotation speed Nin/output shaft rotation speed Nout) selectively established by controlling engagement and release of the engagement devices C by the electronic control device 70 described later in accordance with a driver's accelerator operation, a vehicle speed V, etc. For example, as shown in an engagement operation table in FIG. 3, the multi-speed transmission 22 has eight forward gear positions from a first speed gear position "1st" to an eighth speed gear position "8th" and a reverse gear position "Rev" such that the gear positions are selectively established. The input shaft rotation speed Nin is the rotation speed of the input shaft 32 and the output shaft rotation speed Nout is the rotation speed of the transmission output gear 24. The gear ratio γ of the multi-speed transmission 22 corresponding to each of the gear positions is appropriately defined by gear ratios (=the number of teeth of the sun gear/the number of teeth of the ring gear) ρ1, ρ2, and ρ3 of the first planetary gear device 36, the second planetary gear device 38, and the third planetary gear device 40. The gear ratio_γ is the highest at the first speed gear position "1st" and decreases toward the higher vehicle speed side (the eighth speed gear position "8th" side).

The engagement operation table of FIG. 3 represents the relationship between the gear positions established in the multi-speed transmission 22 and the operation states of the engagement devices C, and "O" and a blank indicate engagement and release of the engagement devices C, respectively. As shown in FIG. 3, among the forward gear positions, the first speed gear position "1st" is established by engagement of the first clutch C1 and the second brake B2. The second speed gear position "2nd" is established by engagement of the first clutch C1 and the first brake B1. The third speed gear position "3rd" is established by engagement of the first clutch C1 and the third clutch C3. The fourth speed gear position "4th" is established by engagement of the first clutch C1 and the fourth clutch C4. The fifth speed gear position "5th" is established by engagement of the first clutch C1 and the second clutch C2. The sixth speed gear position "6th" is established by engagement of the second clutch C2 and the fourth clutch C4. The seventh speed gear position "7th" is established by engagement of the second clutch C2 and the third clutch C3. The eighth speed gear position "8th" is established by engagement of the second clutch C2 and the first brake B1. The reverse gear position "Rev" is established by engagement of the third clutch C3 and the second brake B2. When the engagement devices C are all released, the multi-speed transmission 22 is brought into a neutral state in which no gear position is established (i.e., a neutral state in which power transmission is interrupted).

Returning to FIG. 1, the vehicle 10 includes the electronic control device 70 including a control device of the vehicle 10 related to the shift control of the multi-speed transmission 22, for example. Therefore, FIG. 1 is a diagram of an input/output system of the electronic control device 70 and is a functional block diagram for explaining a main portion of the control function by the electronic control device 70. The electronic control device 70 includes a so-called microcomputer including a CPU, a RAM, a ROM, and an I/O interface, for example, and the CPU executes signal processes in accordance with a program stored in advance in the ROM, while utilizing a temporary storage function of the RAM, to provide various controls of the vehicle 10. For example, the electronic control device 70 provides the output control of the engine 12, the shift control of the multi-speed transmission 22, etc., and is configured separately for the engine output control, the hydraulic control (the shift control), etc., as needed. The electronic control device 70 corresponds to a shift control device of the present invention.

The electronic control device 70 is supplied with each of signals including: a signal indicative of an engine rotation speed Ne detected by an engine rotation speed sensor 52 disposed on the vehicle 10; a signal indicative of the input shaft rotation speed Nin (=turbine rotation speed Nt) that is also the rotation speed of the input shaft 32 detected by an input shaft rotation speed sensor 54; a signal indicative of the output shaft rotation speed Nout of the transmission output gear 24 corresponding to the vehicle speed V detected by an output shaft rotation speed sensor 56; a signal indicative of an accelerator opening degree θacc that is an operation amount of an accelerator pedal detected by an accelerator opening degree sensor 58; a signal indicative of a throttle valve opening degree θth that is an opening degree of an electronic throttle valve detected by a throttle valve opening degree sensor 60; a signal indicative of an operation state (brake-on Bon) of a foot brake detected by a brake switch 62; a signal indicative of an operation position (shift operation position) POSsh of a shift lever such as "P", "R", "N", and "D" detected by a shift position sensor 64; a signal indicative of a hydraulic fluid temperature THoil that is a temperature of hydraulic fluid in the hydraulic control circuit 50 detected by an oil temperature sensor 66; and a signal indicative of an upshift command Sup and a downshift command Sdown based on an operation of paddle switches 69a, 69b (hereinafter referred to as a paddle switch 69 if not particularly distinguished) disposed on a steering wheel 68. The upshift command Sup is output when the paddle switch 69a is operated, the downshift command Sdown is output when the paddle switch 69b is operated, and the number of gear positions is increased or decreased depending on the number of operations of the paddle switch 69.

The electronic control device 70 supplies various devices included in the vehicle 10 (e.g., the engine 12 and the hydraulic control circuit 50) with various command signals (e.g., an engine control command signal Se and a hydraulic pressure control command signal Sat). This hydraulic pressure control command signal Sat is a command signal (hydraulic pressure command value, instruction pressure) for driving the solenoid valves regulating the hydraulic pressures supplied to the hydraulic actuators of the engagement devices C and is output to the hydraulic control circuit 50.

The hydraulic control circuit 50 includes a solenoid valve SL1 for regulating a hydraulic pressure Pc1 (of the hydraulic actuator) of the first clutch C1, a solenoid valve SL2 for regulating a hydraulic pressure Pc2 of the second clutch C2, a solenoid valve SL3 for regulating a hydraulic pressure Pc3 of the third clutch C3, a solenoid valve SL4 for regulating a hydraulic pressure Pc4 of the fourth clutch C4, a solenoid valve SL5 for regulating a hydraulic pressure Pb1 of the first brake B1, and a solenoid valve SL6 for regulating a hydraulic pressure Pb2 of the second brake B2. The solenoid valves SL1 to SL6 regulate the hydraulic pressures Pc of the engagement devices C based on the hydraulic pressure control command signal Sat output from the electronic control device 70.

To implement the control function for various controls in the vehicle 10, the electronic control device 70 functionally includes an engine control means, i.e., an engine control portion 72, a shift control means, i.e., a shift control portion 74, and a blipping control determining means, i.e., a blipping control determining portion 76. The engine control portion 72 and the shift control portion 74 correspond to a control portion of the present invention.

The engine control portion 72 applies the accelerator opening degree θacc and the vehicle speed V (synonymous with the output shaft rotation speed Nout, etc.) to a relationship (e.g., a driving force map) obtained empirically or through design and stored in advance (i.e., predefined) to calculate a driver request torque Tdem. The engine control portion 72 sets a required engine torque Te* at which the driver request torque Tdem is acquired, in consideration of a transmission loss, an accessory load, the gear ratio γ of the multi-speed transmission 22, etc., and outputs the engine control command signal Se for providing the output control of the engine 12 to a throttle actuator, a fuel injection device, an ignition device, etc. such that the required engine torque Te* is acquired.

The shift control portion 74 uses a predefined relationship (shift map, shift diagram) to determine whether to provide a gear switching control switching the gear position of the multi-speed transmission 22, and thereby determines a shift of the multi-speed transmission 22. The shift control portion 74 applies a vehicle speed related value and a drive request amount to the shift map to determine the shift of the multi-speed transmission 22 (i.e., determine the gear position to be established in the multi-speed transmission 22). When the paddle switch 69 is operated by the driver, the shift control portion 74 determines the shift to a gear position intended by the operation of the paddle switch 69. The shift control portion 74 outputs to the hydraulic control circuit 50 the hydraulic pressure control command signal Sat for engaging and/or releasing the engagement devices C involved in the shift of the multi-speed transmission 22 so as to establish the determined gear position.

The shift map is a predetermined relationship having shift lines for determining the shift of the multi-speed transmission 22 on two-dimensional coordinates having the vehicle speed related value and the drive request amount as variables. The shift lines in the shift map are upshift lines for determining an upshift and downshift lines for determining a downshift. The upshift lines and the downshift lines are each determined in advance between gear positions having a difference of one speed from each other in a plurality of gear positions. The shift lines are each used for determining whether the line is crossed by the actual vehicle speed related value on a line indicative of a certain drive request amount or whether the line is crossed by the actual drive request amount on a line indicative of a certain vehicle speed related value, i.e., whether the vehicle speed related value or the drive request amount has crossed a value (shift point) on the shift line at which a shift should be executed, and are each defined in advance as a series of the shift points. The vehicle speed related value is the vehicle speed V or a value related to the vehicle speed V and is, for example, the vehicle speed V, a wheel speed, or the output shaft rotation speed Nout. The drive request amount is a value representative of a magnitude of a drive request from a driver to the vehicle 10 and is, for example, a required drive force Fdem [N] or a required drive torque [Nm] and a required drive power [W] related to the required drive force Fdem [N]. The accelerator opening degree θacc [%], the throttle valve opening degree θth [%], the intake air amount [g/sec], etc. can simply be used as the drive request amount.

When determining a shift to a predetermined gear position of the multi-speed transmission 22, the shift control portion 74 performs a so-called clutch-to-clutch shift making a change in engagement of the engagement devices C involved in the shift of the multi-speed transmission 22 (i.e., engaging an engagement-side engagement device to be engaged after the shift and releasing a release-side engagement device to be released after the shift). For example, in the 2-to-3 upshift from the second speed gear position 2nd to the third speed gear position 3rd, a change in engagement is made between the first brake B1 and the third clutch C3 (i.e., the clutch-to-clutch shift is performed by releasing the first brake B1 and engaging the third clutch C3). In this example, out of the engagement devices C to be changed in engagement at the time of the shift, a frictional engagement device to be released is referred to as a release-side engagement device, and a frictional engagement device to be engaged is referred to as an engagement-side engagement device. The hydraulic pressure control command signal Sat is a release-side instruction pressure for acquiring a torque capacity (clutch torque) of the release-side engagement device during the shift and an engagement-side instruction pressure for acquiring a torque capacity (clutch torque) of the engagement-side engagement device during the shift.

If a downshift of the multi-speed transmission 22 is determined, for example, since the paddle switch 69b is operated by the driver, during inertia running while the driver does not depress the accelerator pedal (i.e., the accelerator opening degree θacc is zero), the shift control portion 74 causes the shift to proceed through providing a shift control described below (hereinafter referred to as "blipping control"), instead of causing the shift to proceed through the change in engagement of the engagement devices C described above.

The blipping control determining portion 76 determines whether to provide the blipping control of the multi-speed transmission 22. When the accelerator opening degree θacc is zero (or a small value close to zero), for example and the downshift command Sdown is output due to the operation of the paddle switch 69b by the driver, the blipping control determining portion 76 determines to provide the blipping control.

If the provision of the blipping control is determined, the shift control portion 74 releases the release-side engagement device to be released after the shift (downshift) to put the multi-speed transmission 22 into the neutral state. Concurrently with the release of the release-side engagement device, the shift control portion 74 puts the engagement-side engagement device to be engaged after the shift into a standby state (packed state). The standby state is a state in which an engagement device does not have a torque capacity, but a state immediately before having a torque capacity. In this case, to improve the responsiveness of the actual hydraulic pressure of the engagement-side engagement device, the shift control portion 74 performs a quick fill to temporarily raise the instruction pressure for the engagement-side engagement device and then sets as the instruction pressure a preset packing pressure Ppc at which the engagement-side engagement device is put into the packed state. When the multi-speed transmission 22 enters the neutral state (or a substantially neutral state), the shift control portion 74 outputs to the engine control portion 72 a command to perform a torque-up control of the engine 12 such that the input shaft rotation speed Nin of the multi-speed transmission 22 is synchronized with an input shaft rotation speed set after the shift (hereinafter referred to as a synchronous rotation speed Ns).

When receiving the command to provide the torque-up control of the engine 12, the engine control portion 72 starts the torque-up control of the engine 12 (synonymous with the start of an inertia phase) such that the input shaft rotation speed Nin increases toward the synchronous rotation speed Ns with a preset target increasing rate α. The engine control portion 72 has a required torque Tre of the engine 12 stored in advance at which the input shaft rotation speed Nin increases with the target increasing rate α, sets a required engine torque Te* (instruction value, target value) of the engine 12 to the required torque Tre, and controls the engine 12 to achieve the required torque Tre (i.e., by using the required torque Tre as a target). This required torque Tre is obtained empirically or through design and stored in advance and is stored as a relationship map having a shift pattern and the vehicle speed V as parameters, for example. The engine control portion 72 applies the shift pattern and the vehicle speed V to the relationship map to decide the required torque Tre.

Alternatively, the engine control portion 72 may calculate a correction value ΔTre of the required torque Tre as needed from a known feedback control expression using as a deviation a difference (=ΔNin−α) between an increasing rate ΔNin of the input shaft rotation speed Nin and the target increasing rate α calculated as needed, and may add the correction value ΔTre to the required torque Tre to correct the required torque Tre as needed.

When the input shaft rotation speed Nin is synchronized with the post-shift synchronous rotation speed Ns due to the torque-up control by the engine control portion 72 (or when the difference between the input shaft rotation speed Nin and the synchronous rotation speed Ns becomes equal to or less than a predetermined value), the shift control portion 74 terminates the torque-up control of the engine 12 and engages the engagement-side engagement device to be engaged after the shift, thereby completing the downshift (blipping control). The start of engagement of the engagement-side engagement device is not necessarily limited to the end of the torque-up control of the engine 12 (i.e., the end of the inertia phase) and may be initiated before the end of the torque-up control (before the end of the inertia phase).

If a shift pattern has a large internal inertia I of the multi-speed transmission 22 during the downshift in the blipping control of the multi-speed transmission 22 described above, a shock (shift shock) may occur because of an increase in an output shaft torque Tout output from the multi-speed transmission 22 since a drive force is transmitted to the output side of the multi-speed transmission 22 (toward the drive wheels 14) in response to a reaction force due to the internal inertia I associated with an increase in rotation speed due to the torque-up control of the engine 12 even when the multi-speed transmission 22 is in the neutral state, so that the drivability may be reduced.

Figure 4:
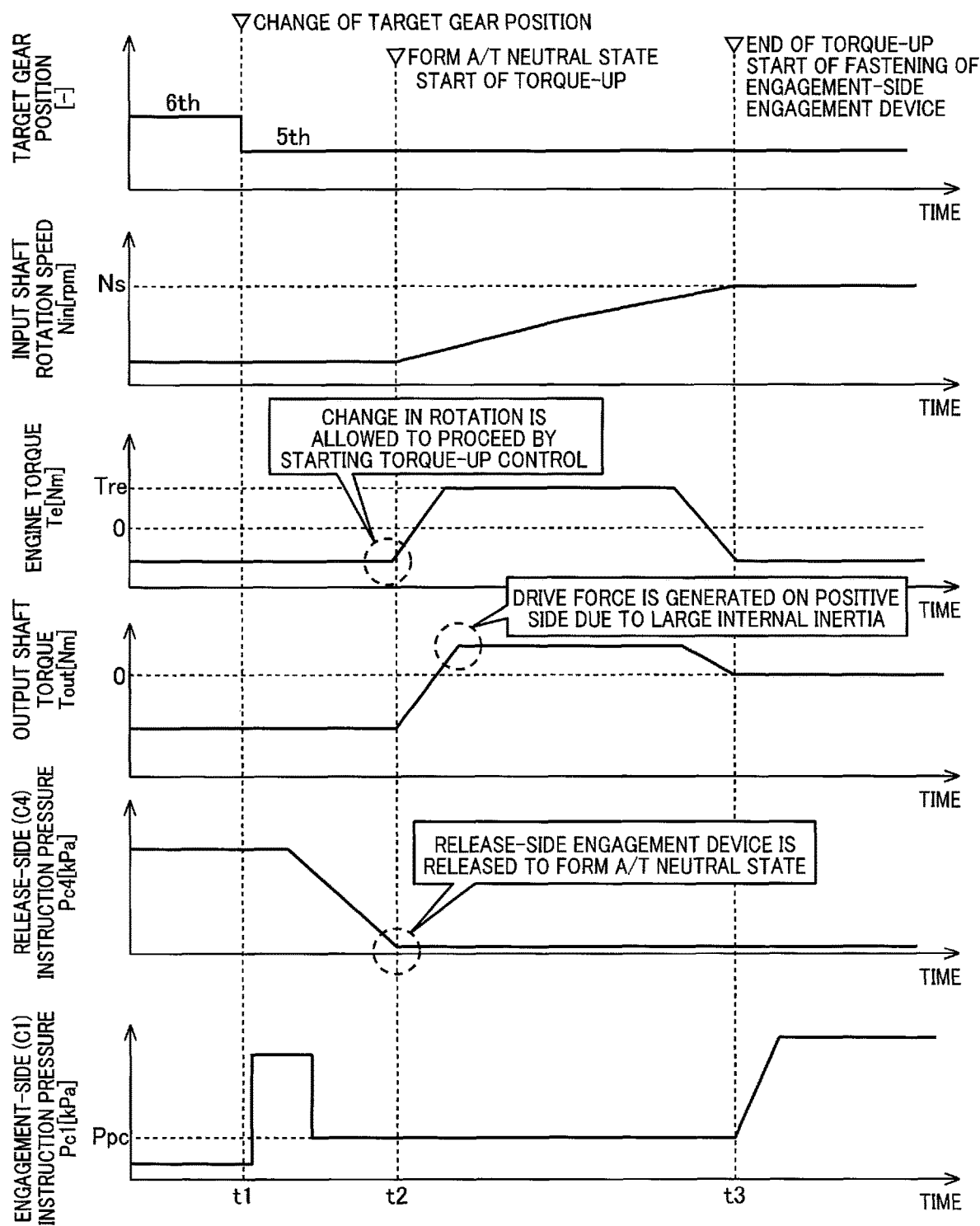
FIG. 4 is a time chart for explaining a control state when a blipping control is provided in a shift pattern having the large internal inertia of the multi-speed transmission.

FIG. 4 is a time chart for explaining a control state when the blipping control is provided in a shift pattern having the large internal inertia I of the multi-speed transmission 22 (e.g., a downshift from the sixth speed gear position "6th" to the fifth speed gear position "5th"). In FIG. 4, time t1 corresponds to a time point when a shift command from the sixth speed gear position "6th" to the fifth speed gear position "5th" is output. Time t2 corresponds to a time point when the release-side engagement device (the fourth clutch C4) is released so that the multi-speed transmission 22 enters the neutral state, and the torque-up control of the engine 12 is started. Time t3 corresponds to a time point when the inertia phase is terminated and the torque-up control of the engine 12 is terminated so that the engagement (fastening) of the engagement-side engagement device is started. In the downshift from the sixth speed gear position "6th" to the fifth speed gear position "5th", the fourth clutch C4 corresponds to the release-side engagement device, and the first clutch C1 corresponds to the engagement-side engagement device.

When the shift command is output at time t1, the downshift (blipping control) from the sixth speed gear position "6th" to the fifth speed gear position "5th" is started. From time t1 to time t2, the instruction pressure of the first clutch C1 corresponding to the engagement-side engagement device is controlled to the packing pressure Ppc at which a state immediately before having a torque capacity (so-called packed state) is achieved, and is kept in this standby state. The fourth clutch C4 corresponding to the release-side engagement device has an instruction pressure Pc4 gradually reduced toward zero for releasing the fourth clutch C4. At time t2, the release-side engagement device is released so that the multi-speed transmission 22 enters the neutral state, and the torque-up control of the engine 12 is started so that the input shaft rotation speed Nin starts increasing (i.e., the start of the inertia phase). In this case, since the internal inertia I of the multi-speed transmission 22 is large, even if the multi-speed transmission 22 is in the neutral state, the torque of the engine 12 is transmitted as a positive drive force toward the drive wheels 14 in response to the reaction force due to the internal inertia I, so that the output shaft torque Tout increases, and a shock (shift shock) occurs due to the increase in the output shaft torque Tout.

Therefore, if the shift pattern of the multi-speed transmission 22 during the downshift is a shift pattern having the large internal inertia I, the shift control portion 74 controls the torque capacity of the engagement-side engagement device in advance to a predetermined value CL greater than zero before starting the torque-up control of the engine 12.

As shown in FIG. 1, the electronic control device 70 functionally includes an internal inertia determining portion 78 determining whether a shift pattern has the large internal inertia I of the multi-speed transmission 22 during the downshift.

The internal inertia determining portion 78 determines whether the shift pattern of the multi-speed transmission 22 is a shift pattern having the large internal inertia I. The internal inertia determining portion 78 first calculates the internal inertia I of the multi-speed transmission 22. The internal inertia I of the multi-speed transmission 22 during the downshift is decided based on the engagement device kept engaged before and after the shift (hereinafter referred to as an engagement device Ck). Specifically, the internal inertia I corresponds to the sum of the moments of inertia of the rotating elements mechanically connected via the engagement device Ck. Therefore, the internal inertia I is obtained by calculating the respective moments of inertia of the rotating elements mechanically connected via the engagement device Ck, and adding all the calculated moments of inertia of the rotating elements. Since the engagement device Ck kept engaged before and after the shift is determined for each shift pattern, the internal inertia I can be obtained in advance for each shift pattern. The internal inertia determining portion 78 stores the internal inertia I obtained in advance for each shift pattern, determines the shift pattern of the downshift to be performed, and uses the internal inertia I stored for each shift pattern so as to decide the internal inertia I. The internal inertia determining portion 78 corresponds to a determining portion of the present invention.

In this example, as shown in FIG. 3, in the downshift from the eighth speed gear position "8th" to the seventh speed gear position "7th", the downshift from the seventh speed gear position "7th" to the sixth speed gear position "6th", and the downshift from the sixth speed gear position "6th" to the fifth speed gear position "5th", the engagement device Ck kept engaged before and after the shift is the second clutch C2. Therefore, the internal inertia I has the same value in these shift patterns. When the second clutch C2 is the engagement device Ck, the internal inertia I is calculated from the sum of the moments of inertia of the carrier RCA, the input shaft 32, and the first carrier CA1 integrally rotated due to the engagement of the second clutch C2. It is assumed that in the present example, the shift patterns with the second clutch C2 engaged before and after the shift correspond to a shift pattern in which the internal inertia I during the downshift is larger than a predetermined value Ip, i.e., a shift pattern having the large internal inertia I.

In the downshift from the fifth speed gear position "5th" to the fourth speed gear position "4th", the downshift from the fourth speed gear position "4th" to the third speed gear position "3rd", the downshift from the third speed gear position "3rd" to the second speed gear position "2nd", and the downshift from the second speed gear position "2nd" to the first speed gear position "1st", the engagement device Ck kept engaged before and after the shift is the first clutch C1. Therefore, the internal inertia I has the same value in these shift patterns. When the first clutch C1 is the engagement device Ck, the internal inertia I is calculated from the sum of the moments of inertia of the first ring gear R1 and the third sun gear S3 integrally rotated due to the engagement of the first clutch C1. It is assumed that in the present example, the shift patterns with the first clutch C1 engaged before and after the shift correspond to a shift pattern in which the internal inertia I during the downshift is not more than the predetermined value Ip, i.e., a shift pattern having the small internal inertia I.

The internal inertia determining portion 78 determines whether the decided internal inertia I is larger than the predetermined value Ip set in advance, and determines that the shift pattern has the large internal inertia I if the internal inertia I is larger than the predetermined value Ip or that the shift pattern has the small internal inertia I if the internal inertia I is not more than the predetermined value Ip. The predetermined value Ip is obtained empirically or through design in advance and is set to a threshold value at which a change in the output shaft torque Tout (or a vehicle longitudinal acceleration G) falls within a range where a driver does not feel strange when the torque-up control of the engine 12 is provided while the internal inertia I is at the predetermined value Ip, or a value close to the threshold value.

If it is determined that the shift pattern has the small internal inertia I, the internal inertia I has almost no influence and, therefore, the blipping control described above is provided. On the other hand, if it is determined that the shift pattern has the large internal inertia I, the shift control portion 74 controls the hydraulic pressure of the engagement-side engagement device to a predetermined hydraulic pressure Ps before the torque-up control of the engine 12. This predetermined oil pressure Ps is set to a value at which the torque capacity of the engagement-side engagement device has the predetermined value CL greater than zero. Therefore, the shift control portion 74 controls the torque capacity of the engagement-side engagement device to the predetermined value CL before the torque-up control of the engine 12. The predetermined value CL of the torque capacity is obtained empirically or through design in advance and is set in view of an increase in the output shaft torque Tout due to the internal inertia I of the multi-speed transmission 22 when the torque-up control of the engine 12 is provided, such that the increase can be suppressed within a range in which a driver does not have a strange feeling.

The shift control portion 74 sets the instruction pressure of the engagement-side engagement device along a preset track and provides control such that the hydraulic pressure (actual pressure) of the engagement-side engagement device follows the track. This track is set such that after waiting for a predetermined time at the packing pressure Ppc following the quick fill, the pressure increases with a predetermined increasing rate toward the predetermined hydraulic pressure Ps. When the instruction pressure of the engagement-side engagement device reaches the predetermined hydraulic pressure Ps, the engine control portion 72 starts the torque-up control of the engine 12. When the input shaft rotation speed Nin of the multi-speed transmission 22 increases due to the torque-up control of the engine 12 and the input shaft rotation speed Nin is synchronized with the post-shift synchronous rotation speed Ns (or when a difference between the input shaft rotation speed Nin and the synchronous rotation speed Ns becomes equal to or less than a predetermined value), the shift control portion 74 engages (fastens) the engagement-side engagement device and completes the downshift (blipping control). By starting the torque-up control of the engine 12 after the torque capacity of the engagement-side engagement device is controlled to the predetermined value CL in this way, the increase in the output shaft torque Tout is suppressed during the torque-up control of the engine 12.

However, since the torque-up control of the engine 12 is not started until the torque capacity of the engagement-side engagement device reaches the predetermined value CL, if the multi-speed transmission 22 enters the neutral state (or a substantially neutral state) in this case, the input shaft rotation speed Nin (i.e., the turbine rotation speed Nt) may drop and a loss of the drive force may occur.

Figure 5:
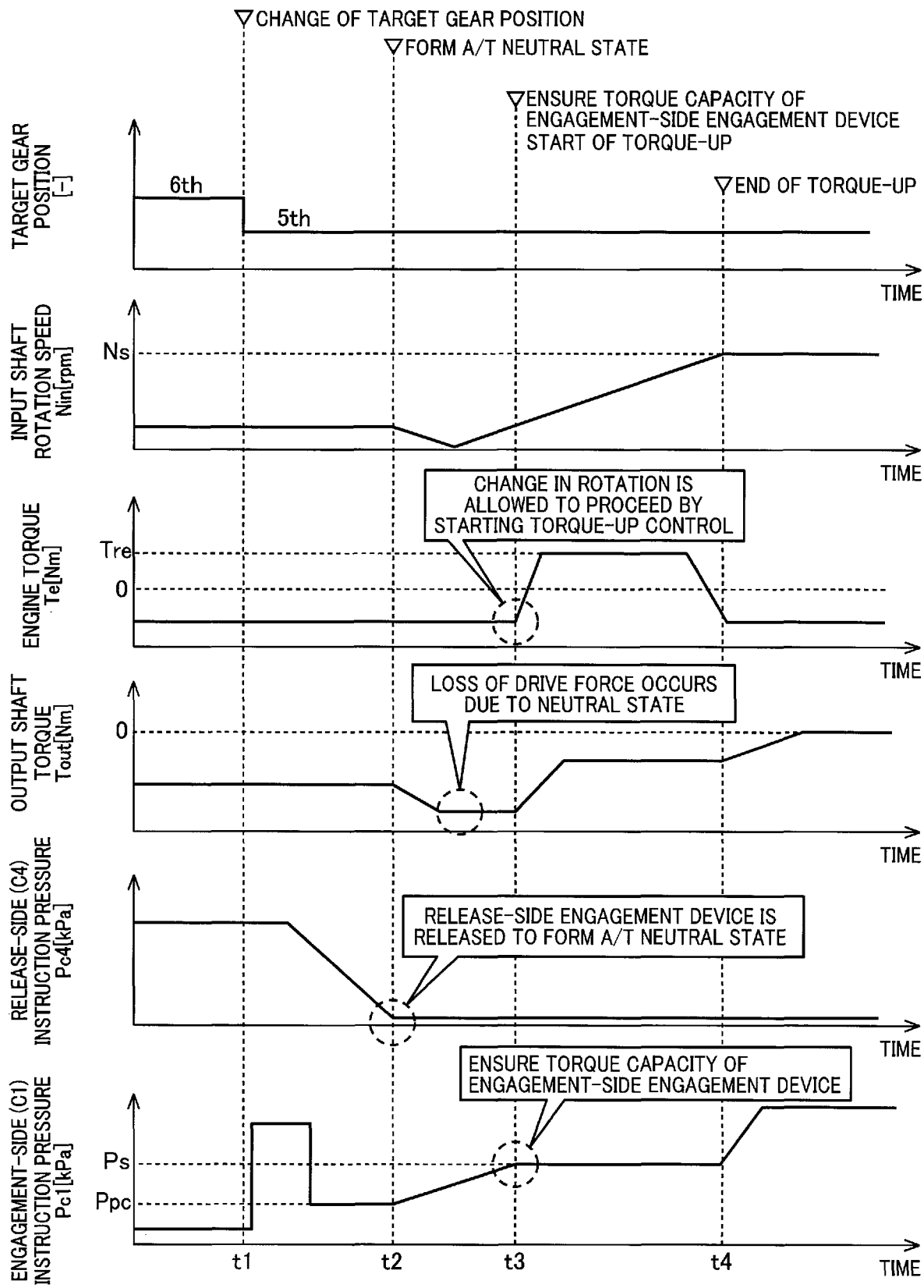
FIG. 5 is a form of a time chart for explaining a control state in the case of providing the blipping control in a shift pattern having the large internal inertia of the multi-speed transmission, when a torque-up control of an engine is provided after a torque capacity of an engagement-side engagement device is ensured.

FIG. 5 is a form of a time chart for explaining a control state in the case of providing the blipping control in a shift pattern having the large internal inertia I of the multi-speed transmission 22, when the torque-up control of the engine 12 is provided after the torque capacity of the engagement-side engagement device is ensured so as to suppress an increase in the output shaft torque Tout during the torque-up control of the engine 12. In FIG. 5, time t1 corresponds to a time point when a shift command from the sixth speed gear position "6th" to the fifth speed gear position "5th" is output. Time t2 corresponds to a time point when the fourth clutch C4 corresponding to the release-side engagement device is released and the multi-speed transmission 22 enters the neutral state. Time t3 corresponds to a time point when an instruction pressure Pc1 of the first clutch C1 corresponding to the engagement-side engagement device reaches the predetermined value Ps and the torque-up control of the engine 12 is started with the torque capacity of the first clutch C1 having reached the predetermined value CL. Time t4 corresponds to a time point when the torque-up control is terminated.

When the shift command of the multi-speed transmission 22 is output at time t1, the downshift (blipping control) from the sixth speed gear position "6th" to the fifth speed gear position "5th" is started. From time t1 to time t2, the instruction pressure of the first clutch C1 corresponding to the engagement-side engagement device is set to the packing pressure Ppc, so that the first clutch C1 is controlled into the state (packed state) immediately before having a torque capacity. The fourth clutch C4 corresponding to the release-side engagement device has the instruction pressure Pc4 gradually reduced so as to release the fourth clutch C4. At time t2, when the fourth clutch C4 is released and the multi-speed transmission 22 enters the neutral state, the instruction pressure Pc1 is gradually increased toward the predetermined hydraulic pressure Ps so as to ensure the torque capacity of the first clutch C1. In this case, since the multi-speed transmission 22 is in the neutral state (or a substantially neutral state) until the torque capacity of the first clutch C1 is ensured (from time t2 to time t3), the input shaft rotation speed Nin (i.e., the turbine rotation speed Nt) drops (undershoots), and a loss of the output shaft torque Tout (loss of the drive force) occurs.

At time t3, when the instruction pressure Pc1 of the first clutch C1 reaches the predetermined value Ps and the torque capacity of the first clutch C1 thereby reaches the predetermined value CL, i.e., it is determined that the torque capacity of the first clutch C1 is ensured, the torque-up control of the engine 12 is started. From time t3 to time t4, the engine torque Te increases due to the torque-up control of the engine 12. Since the first clutch C1 has the torque capacity, a force (torque) in a direction suppressing the increase in the output shaft torque Tout is generated while the torque-up control of the engine 12, and the output shaft torque Tout is restrained from increasing due to the internal inertia I during the torque-up control of the engine 12. If the torque-up control of the engine 12 is provided after the torque capacity of the engagement-side engagement device is ensured as described, the output shaft torque Tout due to the internal inertia I is suppressed during the torque-up control of the engine 12; however, when the multi-speed transmission 22 enters the neutral state before the torque-up control of the engine 12, the drop (undershoot) of the input shaft rotation speed Nin (the turbine rotation speed Nt) and the loss of the output shaft torque Tout (loss of the drive force) may occur.

To prevent the drop (undershoot) of the input shaft rotation speed Nin and the loss of the output shaft torque Tout (loss of the drive force) occurring during the blipping control, the electronic control device 70 functionally includes an engagement-side hydraulic pressure setting means, i.e., an engagement-side hydraulic pressure setting portion 80, setting the instruction pressure of the engagement-side engagement device to an appropriate value during the blipping control, and a release-side hydraulic pressure setting means, i.e., a release-side hydraulic pressure setting portion 82, setting the instruction pressure of the release-side engagement device to an appropriate value.

If it is determined that the shift pattern has the large internal inertia I, the engagement-side hydraulic pressure setting portion 80 sets an instruction pressure of the engagement-side engagement device after quick fill (standby pressure) set before starting the torque-up control of the engine 12 higher than an instruction pressure set in the case of the shift pattern having the small internal inertia I. When the engagement-side engagement device is engaged in the case of the shift pattern having the small internal inertia I, the instruction pressure after performing the quick fill is set to the packing pressure Ppc at which the engagement-side engagement device enters the packed state (the state immediately before the engagement-side engagement device starts having the torque capacity) and is temporarily retained at the packing pressure Ppc. On the other hand, in the case of the shift pattern having the large internal inertia I, the engagement-side hydraulic pressure setting portion 80 corrects the instruction pressure after performing the quick fill to a corrected instruction pressure Pst obtained by adding a preset correction amount β to the packing pressure Ppc set in the case of the shift pattern having the small internal inertia I (Ppc+β). This correction amount β is obtained empirically or through design in advance and is set to a value at which the torque capacity of the engagement-side engagement device is promptly ensured in a period before starting the torque-up control of the engine 12. The shift control portion 74 sets the corrected instruction pressure Pst set by the engagement-side hydraulic pressure setting portion 80, as the instruction value of the engagement-side engagement device to control the hydraulic pressure of the engagement-side engagement device. The packing pressure Ppc set after performing the quick fill corresponds to an instruction pressure of the engagement-side engagement device set in the case of a shift pattern having a small internal inertia of the present invention, and the corrected instruction pressure Pst corresponds to an instruction pressure of the engagement-side engagement device set in the case of a shift pattern having a large internal inertia of the present invention.

If it is determined that the shift pattern has the large internal inertia I, the release-side hydraulic pressure setting portion 82 sets the instruction pressure during release (in release transition) of the release-side engagement device to a value at which the torque capacity of the release-side engagement device is retained at a value greater than zero until the torque-up control of the engine 12 is started. At the time of release of the release-side engagement device in the case of the shift pattern having the small internal inertia I, the instruction pressure (hereinafter referred to as an instruction pressure Pi) is set to decrease with a preset gradient. The release-side hydraulic pressure setting portion 82 corrects the instruction pressure during release (in release transition) of the release-side engagement device to an instruction pressure (hereinafter referred to as a corrected instruction pressure Pt) higher than the instruction pressure Pi of the release-side engagement device set in the case of the shift pattern having the small internal inertia I so that the torque capacity of the release-side engagement device becomes greater than zero until the torque-up control of the engine 12 is started. The instruction pressure Pi corresponds to an instruction pressure in release transition of the release-side engagement device set in the case of a shift pattern having a small internal inertia of the present invention, and the corrected instruction pressure Pt corresponds to an instruction pressure in release transition of the release-side engagement device set in the case of a shift pattern having a large internal inertia of the present invention.

The release-side hydraulic pressure setting portion 82 adds a preset correction amount to the instruction pressure Pi, or sets a standby pressure at which the hydraulic pressure in decrease transition is temporarily retained with respect to the instruction pressure Pi, so as to make a correction such that the corrected instruction pressure Pt becomes higher than the instruction pressure Pi. The corrected instruction pressure Pt of the release-side engagement device in the case of the shift pattern having the large internal inertia I is obtained empirically or through design and stored in advance and is set to a value at which the actual hydraulic pressure of the release-side engagement device is retained at a value higher than zero (the torque capacity of the release-side engagement device is retained at a value greater than zero) until the torque-up control of the engine 12 is started. Preferably, considering a response delay of the actual hydraulic pressure of the release-side engagement device, the corrected instruction pressure Pt is set such that the torque capacity of the engagement-side engagement device is ensured and the torque-up control of the engine 12 is started when (or immediately before) the torque capacity of the release-side engagement device becomes zero.

The corrected instruction pressure Pt of the release-side engagement device may be corrected not only by retaining the constant instruction pressure in decrease transition, but also so that the hydraulic pressure of the release-side engagement device starts decreasing later than the instruction pressure Pi. By setting the corrected instruction pressure Pt of the release-side engagement device in this way, the decrease of the hydraulic pressure (actual hydraulic pressure) of the release-side engagement device is delayed, and the torque capacity of the release-side engagement device is ensured until the torque-up control of the engine 12 is started, so that the drop (undershoot) of the input shaft rotation speed Nin and the loss of the drive force (decrease in the output shaft torque Tout) are suppressed. The shift control portion 74 sets the corrected instruction pressure Pt set by the release-side hydraulic pressure setting portion 82, as the instruction pressure of the release-side engagement device to control the hydraulic pressure of the release-side engagement device.

FIG. 6 is a flowchart for explaining a main portion of the control operation of the electronic control device 70, i.e. the control operation of suppressing the shift shock occurring during the blipping control. This flowchart is repeatedly executed during running of the vehicle.

First, at step S1 (hereinafter, step is omitted) corresponding to the control function of the blipping control determining portion 76, it is determined whether the blipping control (downshift with the blipping control) of the multi-speed transmission 22 is provided. If S1 is negative, this routine is terminated. If S1 is affirmative, the internal inertia I of the multi-speed transmission 22 during the downshift is obtained to determine whether the shift pattern has the large internal inertia I based on whether the internal inertia I is greater than the predetermined value Ip at S2 corresponding to the control function of the internal inertia determining portion 78. If the internal inertia I is larger than the predetermined value Ip, it is determined that the shift pattern has the large internal inertia I, and the operation goes to S3. On the other hand, if the internal inertia I is not more than the predetermined value Ip, it is determined that the shift pattern has the small internal inertia I, and the operation goes to S5.

At S3 corresponding to the control function of the engagement-side hydraulic pressure setting portion 80, the instruction pressure set at the time of engagement of the engagement-side engagement device is set (corrected) to the corrected instruction pressure Pt higher than the packing pressure Ppc set at the time of normal engagement. At S4 corresponding to the control function of the release-side hydraulic pressure setting portion 82, the instruction pressure in release transition of the release-side engagement device is set (corrected) to the corrected instruction pressure Pt having a value higher than the instruction pressure Pi set in the case of the shift pattern having the small internal inertia I. For example, the corrected instruction pressure Pt is corrected such that the hydraulic pressure is temporarily retained in the decrease transition of the instruction pressure Pi. Alternatively, the corrected instruction pressure Pt is corrected such that the hydraulic pressure decrease start time is delayed as compared to the hydraulic pressure decrease start time of the instruction pressure Pi of the release-side engagement device. S3 and S4 are concurrently executed, and the hydraulic pressures of the engagement-side engagement device and the release-side engagement device are controlled based on the instruction pressures set (corrected) at S3 and S4. After the instruction pressure of the engagement-side engagement device is temporarily retained at the corrected instruction pressure Ps, when the torque capacity of the engagement-side engagement device is ensured by gradually increasing the instruction pressure, the torque-up control of the engine 12 is started. At S5 corresponding to the control function of the shift control portion 74, the instruction pressures of the engagement-side engagement device and release-side engagement device are set to the hydraulic pressures set in the case of the shift pattern having the small internal inertia I.

FIG. 7 is an example of a time chart showing a control state when the blipping control from the sixth speed gear position "6th" to the fifth speed gear position "5th" is provided based on the flowchart of FIG. 6. This time chart corresponds to the case of the internal inertia I of the multi-speed transmission 22 larger than the predetermined value Ip. Time t1 corresponds to a time point when a shift command from the sixth speed gear position "6th" to the fifth speed gear position "5th" is output. Time t2 corresponds to a time point when the instruction pressure Pc1 of the first clutch C1 corresponding to the engagement-side engagement device starts increasing. Time t3 corresponds to a time point when the torque capacity of the first clutch C1 is ensured and the torque-up control of the engine 12 is started. Time t4 corresponds to a time point when the torque-up control of the engine 12 is terminated.

When the shift is output at time t1, the downshift (blipping control) from the sixth speed gear position "6th" to the fifth speed gear position "5th" is started. At time t1, it is determined whether the shift pattern has the large internal inertia I. From time t1 to time t2, the instruction pressure Pc1 of the first clutch C1 corresponding to the engagement-side engagement device is temporarily increased by performing a so-called quick fill and is subsequently retained at the corrected instruction pressure Pst. The corrected instruction pressure Pst is corrected to a value higher than the packing pressure Ppc indicated by a broken line at which the first clutch C1 enters the packed state. By setting the instruction pressure Pc1 to the corrected instruction pressure Pst higher than the packing pressure Ppc in this way, the actual hydraulic pressure of the first clutch C1 rapidly increases so that the torque capacity of the first clutch C1 is promptly ensured. The instruction pressure Pc4 of the fourth clutch C4 corresponding to the release-side engagement device has started decreasing. The instruction pressure Pc4 of the fourth clutch C4 is set to a value higher than the instruction pressure Pi set in the case of the shift pattern having the small internal inertia I indicated by a broken line. Specifically, the instruction pressure Pc4 is temporarily retained at the predetermined hydraulic pressure Pt in decrease transition of the instruction pressure Pc4 of the fourth clutch C4.

At time t2, the instruction pressure Pc1 of the first clutch C1 starts increasing and the instruction pressure Pc1 increases toward the predetermined hydraulic pressure Ps. Since the instruction pressure Pc1 at time t2 is the corrected instruction pressure Pst higher than the packing pressure Ppc, the increase of the actual hydraulic pressure is accelerated and the torque capacity of the first clutch C1 is promptly ensured. The instruction pressure Pc4 of the fourth clutch C4 is gradually reduced toward zero. Since the instruction pressure Pc4 of the fourth clutch C4 is set to a value higher than the instruction pressure Pi set in the case of the shift pattern having the small internal inertia I indicated by the broken line, the fourth clutch C4 has a torque capacity between time t2 and time t3, so that the drop (undershoot) of the input shaft rotation speed Nin as indicated by a broken line is suppressed and a reduction in the output shaft torque Tout (loss of the drive force) indicated by a broken line is suppressed.

At time t3, the torque capacity of the first clutch C1 is ensured and the torque-up control of the engine 12 is started. Since the torque capacity of the first clutch C1 is ensured and, therefore, the force (torque) acts in the direction suppressing an increase in drive force while the transmission of the drive force due to the reaction force of the internal inertia I is performed associated with the torque-up control of the engine 12, an increase in the output shaft torque Tout as indicated by a broken line is suppressed. At time t4, the input shaft rotation speed Nin synchronizes with the synchronous rotation speed Ns so that the torque-up control of the engine 12 is terminated, and the first clutch C1 is completely engaged.

In this way, since the torque capacity of the first clutch C1 serving as the engagement-side engagement device is ensured when the torque-up control of the engine 12 is started, the increase in the output shaft torque Tout due to the reaction force of the internal inertia I is suppressed. Since the instruction pressure Pc4 of the fourth clutch C4 serving as the release-side engagement device is corrected, the drop (undershoot) of the input shaft rotation speed Nin and the loss of the drive force are restrained from occurring due to the multi-speed transmission 22 entering the neutral state before the torque-up control of the engine 12.

As described above, according to this example, if the shift pattern has the large internal inertia I of the multi-speed transmission 22, the torque capacity of the engagement-side engagement device is controlled to the predetermined value greater than zero before the torque-up control of the engine 12 is provided, and therefore, a force (torque) acts in the direction opposite to the torque transmission to the output side of the multi-speed transmission 22 due to the reaction force of the internal inertia I at the time of torque-up control of the engine 12. Thus, an increase in the drive force during the torque-up control of the engine can be suppressed so as to restrain a shock from occurring during the downshift control and to prevent a reduction in drivability due to occurrence of the shock.

According to this example, if the shift pattern has the large internal inertia I of the multi-speed transmission 22, the instruction pressure in engagement transition of the engagement-side engagement device set before starting the torque-up control of the engine is set to the corrected instruction pressure Pst higher than the instruction pressure (i.e., the packing pressure Ppc) of the engagement-side engagement device set in the case of the shift pattern having the small internal inertia I, so that the torque capacity of the engagement-side engagement device can promptly be ensured.

According to this example, the instruction pressure in release transition of the release-side engagement device set in the case of the shift pattern having the large internal inertia I of the multi-speed transmission 22 is set to the corrected instruction pressure Pt higher than the instruction pressure Pi of the release-side engagement device set in the case of the shift pattern having the small internal inertia I, so that the drop of the input shaft rotation speed Nin of the multi-speed transmission 22 and the loss of the drive force can be restrained from occurring due to the multi-speed transmission 22 entering the neutral state before starting the torque-up control of the engine 12.

Although the example of the present invention has been described in detail with reference to the drawings, the present invention can be also applied in other forms.

For example, in the example described above, the internal inertia I is obtained from the shift pattern during downshift to determine whether the shift pattern has the large internal inertia I based on whether the internal inertia I is greater than the predetermined value Ip; however, since the internal inertia I can be obtained based on the engagement device Ck kept engaged before and after the shift for each shift pattern and whether the shift pattern has the large internal inertia I can be defined for each shift pattern, a determination may directly be made on whether the shift pattern has the large internal inertia I, based on the shift pattern.

In the example described above, the release-side hydraulic pressure setting portion 82 (i) temporarily retains the instruction pressure in decrease transition, or (ii) causes the instruction pressure to start decreasing later, such that the torque capacity of the release-side engagement device is ensured until the torque-up control of the engine 12 is started; however, the instruction pressure of the release-side engagement device only needs to be corrected through at least one of these corrections (i) and (ii) and, for example, the instruction pressure may be corrected through both of these corrections (i) and (ii). If the drop of the input shaft rotation speed Nin or the loss of the drive force causes no problem, the instruction pressure of the release-side engagement device may not be corrected by the release-side hydraulic pressure setting portion 82.

In the example described above, a control portion may further be included that learns as needed the instruction pressure Pt of the release-side engagement device set by the release-side hydraulic pressure setting portion 82 to be an appropriate value based on an amount of the drop of the input shaft rotation speed Nin, for example. A control portion may further be included that learns as needed the instruction pressure Pst of the engagement-side engagement device set by the engagement-side hydraulic pressure setting portion 80 to be an appropriate value based on an amount of change in the longitudinal acceleration G of the vehicle, for example.

In the example described above, the corrected instruction pressure Pst is obtained by adding the preset correction amount β to the packing pressure Ppc; however, the correction may be changed into an appropriate form such as multiplying the packing pressure Ppc by a preset correction coefficient. The correction amount f3 and the correction coefficient may appropriately be changed depending on the internal inertia I, for example.

Although the blipping control is provided when the paddle switch 69 is manually operated to the downshift side by the driver during inertia running in the example described above, the present invention is not necessarily limited thereto, and the blipping control may be provided also when the execution of the downshift is determined since a vehicle speed related value or a drive request amount crosses a downshift line in a shifting map which defines shifting conditions. Additionally, the manual operation by the driver is not limited to that with the paddle switch 69 and may appropriately be changed to that with the shift lever etc.

Although the multi-speed transmission 22 is a transmission capable of shifting nine forward speed gear positions in the example described above, the number of gear positions etc., is not limited thereto and may appropriately be changed. In short, the present invention is applicable to any transmission in which a shift between multiple speeds is performed according to engagement and release of frictional engagement devices.

In the example described above, the downshift (blipping control) from the sixth speed gear position "6th" to the fifth speed gear position "5th" has been described as an example; however, the present invention is also applicable to downshifts to other gear positions.

The above description is merely an embodiment and the present invention can be implemented in variously modified and improved forms based on the knowledge of those skilled in the art.

REFERENCE SIGNS LIST

10: Vehicle
12: Engine (Internal combustion engine)
22: Multi-speed transmission
70: Electronic control device (Shift control device)
72: Engine control portion (Control portion)
74: Shift control portion (Control portion)
78: Internal inertia determining portion (Determining portion)
80: Engagement-side hydraulic pressure setting portion
82: Release-side hydraulic pressure setting portion
Ck: Engagement device kept engaged before and after the shift

What is claimed is:

1. A shift control device of a vehicle including an internal combustion engine and a multi-speed transmission in series, the shift control device comprising:
   a control portion configured to provide a downshift control in which an input shaft rotation speed of the multi-speed transmission is increased through a torque-up of the internal combustion engine toward a post-shift input shaft rotation speed in a neutral state where a release-side engagement device to be released during a downshift of the multi-speed transmission is released, so as to engage an engagement-side engagement device to be kept engaged after the shift, wherein
   in the case of a shift pattern having an internal inertia of the multi-speed transmission that is larger than a predetermined value, the control portion controls a torque capacity of the engagement-side engagement device to a value greater than zero before starting a torque-up control of the internal combustion engine.

2. The shift control device of the vehicle according to claim 1, comprising an engagement-side hydraulic pressure setting portion configured to make an instruction pressure of the engagement-side engagement device set before starting the torque-up control of the internal combustion engine higher in the case of the shift pattern having the internal inertia of the multi-speed transmission that is larger than the predetermined value as compared to an instruction pressure of the engagement-side engagement device set in the case of a shift pattern in which an internal inertia is not more than that predetermined value.

3. The shift control device of the vehicle according to claim 2, comprising a release-side hydraulic pressure setting portion configured to make an instruction pressure in release transition of the release-side engagement device set in the case of the shift pattern having the internal inertia of the multi-speed transmission that is larger than the predetermined value as compared to an instruction pressure in release transition of the release-side engagement device set in the case of the shift pattern in which the internal inertia is not more than the predetermined value.

4. The shift control device of the vehicle according to claim 3, comprising a determining portion configured to determine that the shift pattern has a large internal inertia when the internal inertia of the multi-speed transmission is larger than the predetermined value, and that the shift pattern has a small internal inertia when the internal inertia is not more than the predetermined value.

5. The shift control device of the vehicle according to claim 4, wherein the internal inertia of the multi-speed transmission is determined based on an engagement device kept engaged before and after the shift.

6. The shift control device of the vehicle according to claim 3, wherein the internal inertia of the multi-speed transmission is determined based on an engagement device kept engaged before and after the shift.

7. The shift control device of the vehicle according to claim 2, comprising a determining portion configured to determine that the shift pattern has a large internal inertia when the internal inertia of the multi-speed transmission is larger than the predetermined value, and that the shift pattern has a small internal inertia when the internal inertia is not more than the predetermined value.

8. The shift control device of the vehicle according to claim 7, wherein the internal inertia of the multi-speed transmission is determined based on an engagement device kept engaged before and after the shift.

9. The shift control device of the vehicle according to claim 2, wherein the internal inertia of the multi-speed transmission is determined based on an engagement device kept engaged before and after the shift.

10. The shift control device of the vehicle according to claim 1, comprising a release-side hydraulic pressure setting portion configured to make an instruction pressure in release transition of the release-side engagement device set in the case of the shift pattern having the internal inertia of the multi-speed transmission that is larger than the predetermined value as compared to an instruction pressure in release transition of the release-side engagement device set in the case of a shift pattern in which an internal inertia is not more than the predetermined value.

11. The shift control device of the vehicle according to claim 10, comprising a determining portion configured to determine that the shift pattern has a large internal inertia when the internal inertia of the multi-speed transmission is larger than the predetermined value, and that the shift pattern has a small internal inertia when the internal inertia is not more than the predetermined value.

12. The shift control device of the vehicle according to claim 11, wherein the internal inertia of the multi-speed transmission is determined based on an engagement device kept engaged before and after the shift.

13. The shift control device of the vehicle according to claim 10, wherein the internal inertia of the multi-speed transmission is determined based on an engagement device kept engaged before and after the shift.

14. The shift control device of the vehicle according to claim 1, comprising a determining portion configured to determine that the shift pattern has a large internal inertia when the internal inertia of the multi-speed transmission is larger than the predetermined value, and that the shift pattern has a small internal inertia when the internal inertia is not more than the predetermined value.

15. The shift control device of the vehicle according to claim 14, wherein the internal inertia of the multi-speed transmission is determined based on an engagement device kept engaged before and after the shift.

16. The shift control device of the vehicle according to claim 1, wherein the internal inertia of the multi-speed transmission is determined based on an engagement device kept engaged before and after the shift.

* * * * *